US011024305B2

(12) United States Patent
Weeks

(10) Patent No.: US 11,024,305 B2
(45) Date of Patent: Jun. 1, 2021

(54) SYSTEMS AND METHODS FOR USING IMAGE SEARCHING WITH VOICE RECOGNITION COMMANDS

(71) Applicant: Dolbey & Company, Inc., Cincinnati, OH (US)

(72) Inventor: Curtis A. Weeks, Loveland, OH (US)

(73) Assignee: Dolbey & Company, Inc., Cincinnati, OH (US)

( * ) Notice: Subject to any disclaimer, the term of this patent is extended or adjusted under 35 U.S.C. 154(b) by 357 days.

(21) Appl. No.: 15/903,336

(22) Filed: Feb. 23, 2018

(65) Prior Publication Data

US 2019/0043495 A1    Feb. 7, 2019

Related U.S. Application Data

(60) Provisional application No. 62/541,841, filed on Aug. 7, 2017.

(51) Int. Cl.
*G10L 15/22* (2006.01)
*G06F 3/16* (2006.01)
*G06F 16/532* (2019.01)

(52) U.S. Cl.
CPC ............ *G10L 15/22* (2013.01); *G06F 3/167* (2013.01); *G06F 16/532* (2019.01); *G10L 2015/223* (2013.01)

(58) Field of Classification Search
CPC ................................ G10L 15/22; G06F 16/532
See application file for complete search history.

(56) References Cited

U.S. PATENT DOCUMENTS

| | | | | |
|---|---|---|---|---|
| 10,523,975 | B2 * | 12/2019 | Hattori | H04N 21/8456 |
| 2002/0010589 | A1 * | 1/2002 | Nashida | H04N 21/8586 |
| | | | | 704/275 |
| 2002/0013701 | A1 * | 1/2002 | Oliver | G06F 3/16 |
| | | | | 704/231 |
| 2002/0128847 | A1 * | 9/2002 | Ancona | G10L 15/26 |
| | | | | 704/275 |
| 2003/0083577 | A1 * | 5/2003 | Greenberg | A61B 5/7475 |
| | | | | 600/437 |
| 2003/0234818 | A1 * | 12/2003 | Schmid | G10L 15/26 |
| | | | | 715/810 |
| 2004/0037540 | A1 * | 2/2004 | Frohlich | G11B 27/034 |
| | | | | 386/285 |
| 2004/0102959 | A1 * | 5/2004 | Estrin | G07C 9/37 |
| | | | | 704/8 |
| 2005/0193343 | A1 * | 9/2005 | Kawabe | G06F 3/048 |
| | | | | 715/716 |
| 2010/0088100 | A1 * | 4/2010 | Lindahl | G10L 21/06 |
| | | | | 704/270.1 |
| 2012/0089392 | A1 * | 4/2012 | Larco | G10L 15/063 |
| | | | | 704/231 |

(Continued)

*Primary Examiner* — Michael N Opsasnick
(74) *Attorney, Agent, or Firm* — Dinsmore & Shohl LLP

(57) ABSTRACT

Embodiments described herein include systems and methods for using image searching with voice recognition commands. Embodiments of a method may include providing a user interface via a target application and receiving a user selection of an area on the user interface by a user, the area including a search image. Embodiments may also include receiving an associated voice command and associating, by the computing device, the associated voice command with the search image.

18 Claims, 6 Drawing Sheets

(56) References Cited

U.S. PATENT DOCUMENTS

| | | | |
|---|---|---|---|
| 2012/0110456 A1* | 5/2012 | Larco | G06F 3/167 |
| | | | 715/728 |
| 2012/0265538 A1* | 10/2012 | Gustafsson | H04N 5/23203 |
| | | | 704/275 |
| 2013/0033644 A1* | 2/2013 | Kim | H04N 21/42203 |
| | | | 348/563 |
| 2014/0195250 A1* | 7/2014 | Gustafsson | H04N 5/23203 |
| | | | 704/275 |
| 2015/0222780 A1* | 8/2015 | Lee | H04N 1/2129 |
| | | | 348/231.99 |
| 2015/0278998 A1* | 10/2015 | Jothiswaran | G06T 3/60 |
| | | | 345/650 |
| 2016/0358603 A1* | 12/2016 | Azam | G10L 15/1815 |
| 2017/0019362 A1* | 1/2017 | Kim | H04L 51/10 |
| 2018/0039859 A1* | 2/2018 | Harwath | G06N 3/0481 |
| 2018/0247624 A1* | 8/2018 | Elkins | G10H 1/18 |

* cited by examiner

FIG. 2

SYSTEMS AND METHODS FOR USING IMAGE SEARCHING WITH VOICE RECOGNITION COMMANDS

CROSS REFERENCE

This application claims the benefit of U.S. Provisional Application Ser. No. 62/541,841, filed Aug. 7, 2017, which is also incorporated by reference in its entirety.

TECHNICAL FIELD

Embodiments described herein generally relate to systems and methods for using image searching with voice recognition commands and, more specifically, to enable selection of an icon or other image on a computer screen via a voice command.

BACKGROUND

Currently, many voice recognition applications are able to transcribe dictation and perform some basic formatting functions. However, users now demand increased functionality in voice recognition software such as being able to automate their application with voice. For example, click on a button, check a check box, click into a text entry area. Traditionally, this functionality is accomplished using operating system application program interfaces (APIs), target application APIs, and/or target applications text control APIs that the voice application interfaces with to perform certain voice commands actions. This approach may function for target applications that expose the API functionality necessary to support the automation needed for performing the desired commands. However, many target applications do not embed speech recognition functionality, and not all target applications provide APIs to allow for commands. This particular problem is necessarily rooted in computer and network technology and relates to performance of a computer, specifically arising in the health care market. For example, many EHR applications now run as virtual applications (for example, using Citrix® XenApp®) in a cloud hosted environment limiting access to traditional APIs.

SUMMARY

Embodiments described herein include systems and methods for using image searching with voice recognition commands. Embodiments of a method may include providing a user interface via a target application and receiving a user selection of an area on the user interface by a user, the area including a search image. Embodiments may also include receiving an associated voice command and associating, by the computing device, the associated voice command with the search image.

Embodiments of systems may include a computing device that stores application logic, voice command logic, and voice recognition logic that, when executed by the computing device, causes the system to provide, via the voice command logic, a user interface with at least one user option and receive, via the voice command logic, a user selection of an area on the user interface by a user, the area including a search image. In some embodiments, the logic may further cause the system to receive, via the voice command logic, an associated voice command and associate, via the voice command logic, the associated voice command with the search image such that when a user speaks the associated voice command, the at least one user option is selected.

Embodiments of a non-transitory computer-readable medium include logic that causes a computing device to provide a user interface via a target application, receive a user selection of an area on the user interface by a user, the area including a search image, and receive an associated voice command. In some embodiments, the logic may further cause the computing device to associate the associated voice command with the search image.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 2 depicts a user interface for a target application to use image searching with voice recognition commands, according to embodiments described herein;

DETAILED DESCRIPTION

Embodiments disclosed herein include systems and methods for using image searching with voice recognition commands. Some embodiments include three features. A first feature includes the ability to configure a voice command function using screen image selection techniques. A second feature includes submission of the voice command list as speech grammar together with the recorded audio to a speech recognition engine. A third feature includes fast image search techniques to find the image on the screen and perform the mouse action. The systems and methods for using image searching with voice recognition commands incorporating the same will be described in more detail, below.

Figure 1:
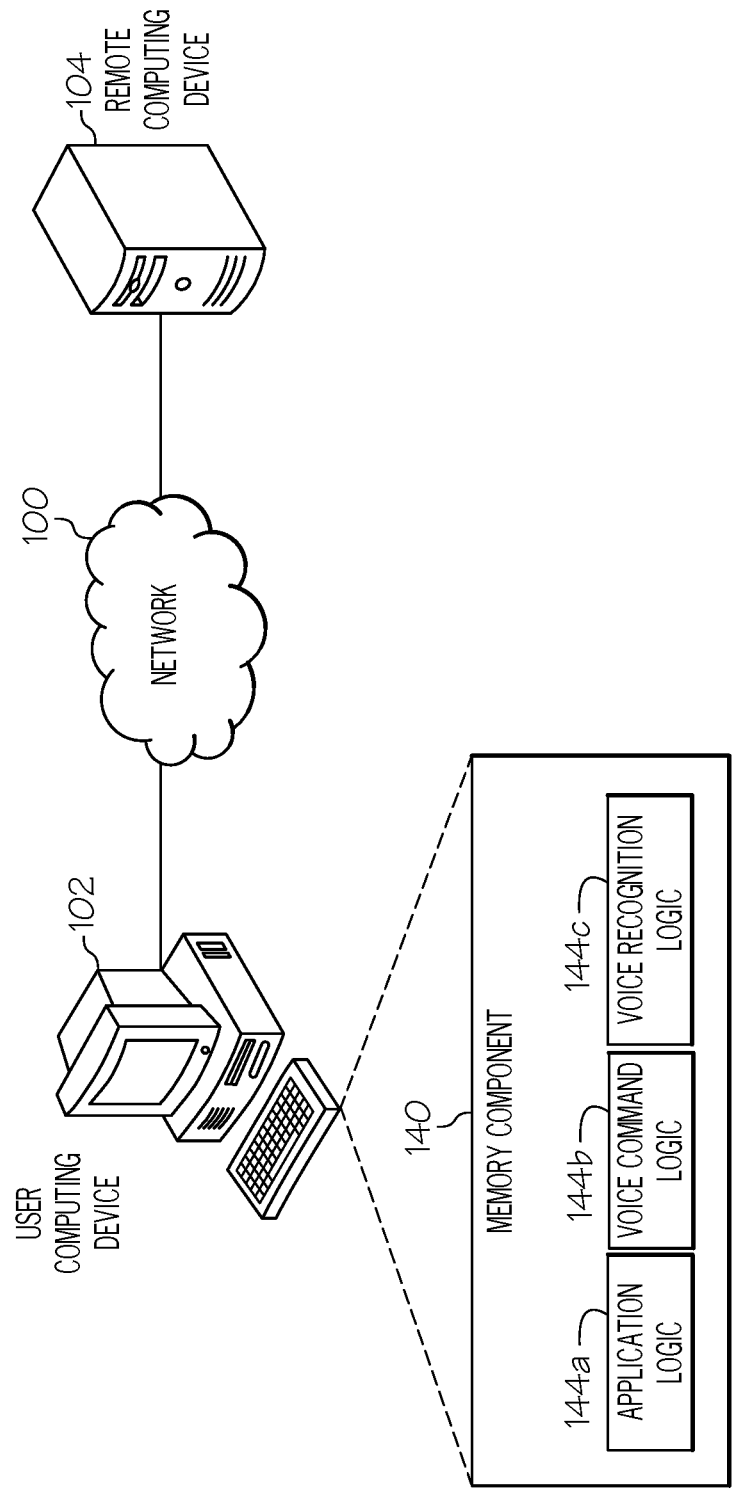
FIG. 1 depicts a computing environment for using image searching with voice recognition commands, according to embodiments described herein.

Referring now to the drawings, FIG. 1 depicts a computing environment for using image searching with voice recognition commands, according to embodiments described herein. As illustrated, the computing environment includes a network 100, a user computing device 102, and a remote computing device 104. The network 100 may include any wide area network (such as the internet, a cellular network, a public switched telephone network, etc.), local network (such as a local area network, Wi-Fi network, etc.) and/or any near field network (such as via near field communication, Bluetooth, etc.) for communicating data between the user computing device 102 and the remote computing device 104.

The user computing device 102 may include any personal computer, laptop, tablet, mobile device, and/or other device that includes and/or provides a user interface (such as a monitor, keyboard, mouse, touchscreen, etc.) and otherwise performs the functionality described herein. The user computing device 102 may include and/or be coupled to a microphone for receiving voice commands from a user. In some embodiments, the microphone may include one or more input devices for receiving additional user input.

The user computing device 102 may additionally include a memory component 140, which stores application logic 144a, voice command logic 144b, and voice recognition logic 144c. The target application logic 144a may cause the user computing device 102 to provide a target application that includes a word processing component, text input component, etc. The voice command logic 144b may be included with the application logic 144a and/or may be a standalone piece of logic. Regardless, the voice command logic 144b may be configured as a selector tool for creating a voice command function and associating the voice command function with a search image, as described herein. The voice recognition logic 144c may cause the user computing device 102 to receive a voice command (such as from the microphone 106) and implement the associated voice command on the application logic 144a. Depending on the embodiment, the voice recognition logic 144c may be included as part of the application logic 144a, the voice command logic 144b, and/or may be a standalone component.

The remote computing device 104 may include similar components as the user computing device 102, but may be configured as a server, personal computer, laptop, tablet, mobile device, etc. Depending on the particular embodiment, the application logic 144a, the voice command logic 144b, the voice recognition logic 144c, and/or other logic providing functionality described herein may be stored by the remote computing device 104 and provided to the user computing device 102 via the network 100.

Figure 2:
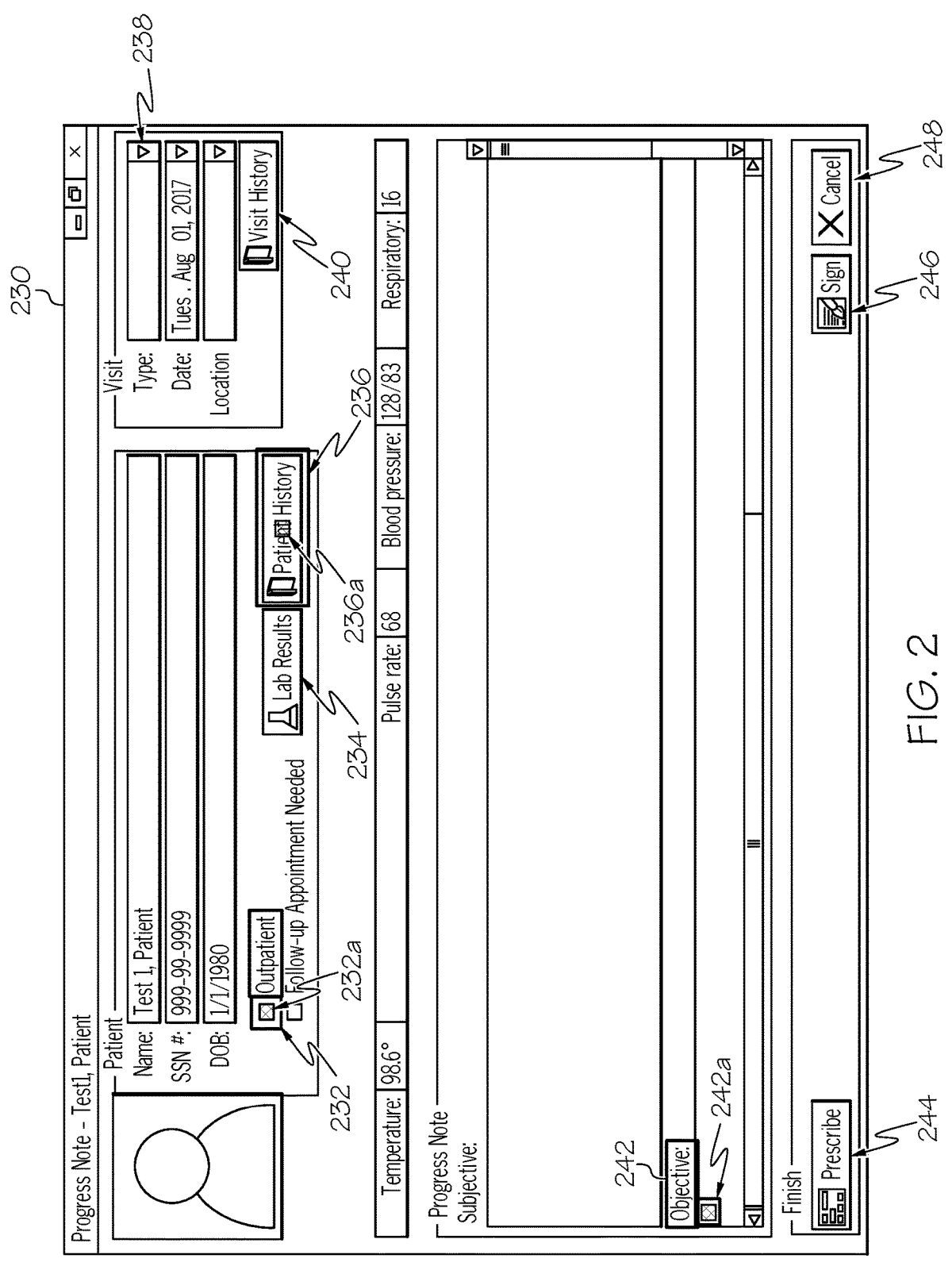

FIG. 2 depicts a user interface 230 for a target application to use image searching with voice recognition commands, according to embodiments described herein. As illustrated, the user interface 230 includes a plurality of user options, such as an outpatient field 232 with a check box, lab button 234, patient history button 236, drop down 238, visit history button 240, objective field 242, prescribe button 244, sign button 246, and cancel button 248.

Accordingly, embodiments described herein provide the user with options to outline the area of the target application (e.g., button area) that the user wants the voice command to operate (for example, the check box associated with the outpatient field 232). Based on the target area selected, these embodiments provide the user with a more precise sub-area within the selected area or relative to the selected area to actually click the mouse (or otherwise select the option). The user interface 230 depicts three areas as examples with the check box associated with the outpatient field 232, the patient history button 236, and the objective field 242. The areas outlined demonstrate the area the user selected with a selector tool. The thatched sub-areas (232a, 236a, 242a) demonstrate the sub-areas where the user wants the mouse click to occur. Whereas a mouse click could be defined as a right-click, left-click, double-click, use of an alternate mouse button, or simply the function of moving the mouse pointer to the sub-area location without a click.

For the patient history button 236, the full image of the button may be selected and the sub-area 236a may be identified at the center of the patient history button 236. By default, if a mouse click location is not identified, the sub-area 236a may occur in the center of the search image.

For the outpatient field 232, the user selects a check box as the sub-area 232a to click the mouse.

For the objective field 242, the user selects the objective label above the sub-area 242a for the mouse selection, such that when the voice command is recognized the mouse selection occurs under the search image. This scenario allows for variable contents below the search image, such in the case where the text field below the word "objective" already has text therein.

In some embodiments, the target application may present the area the user wants to select with different colors or dimensions. To accommodate, embodiments described herein allow for the voice command function to be configured with one or more alternate search images such that when the voice command function is executed the speech application can search for at least one alternate image if the primary image is not located.

Figure 3:
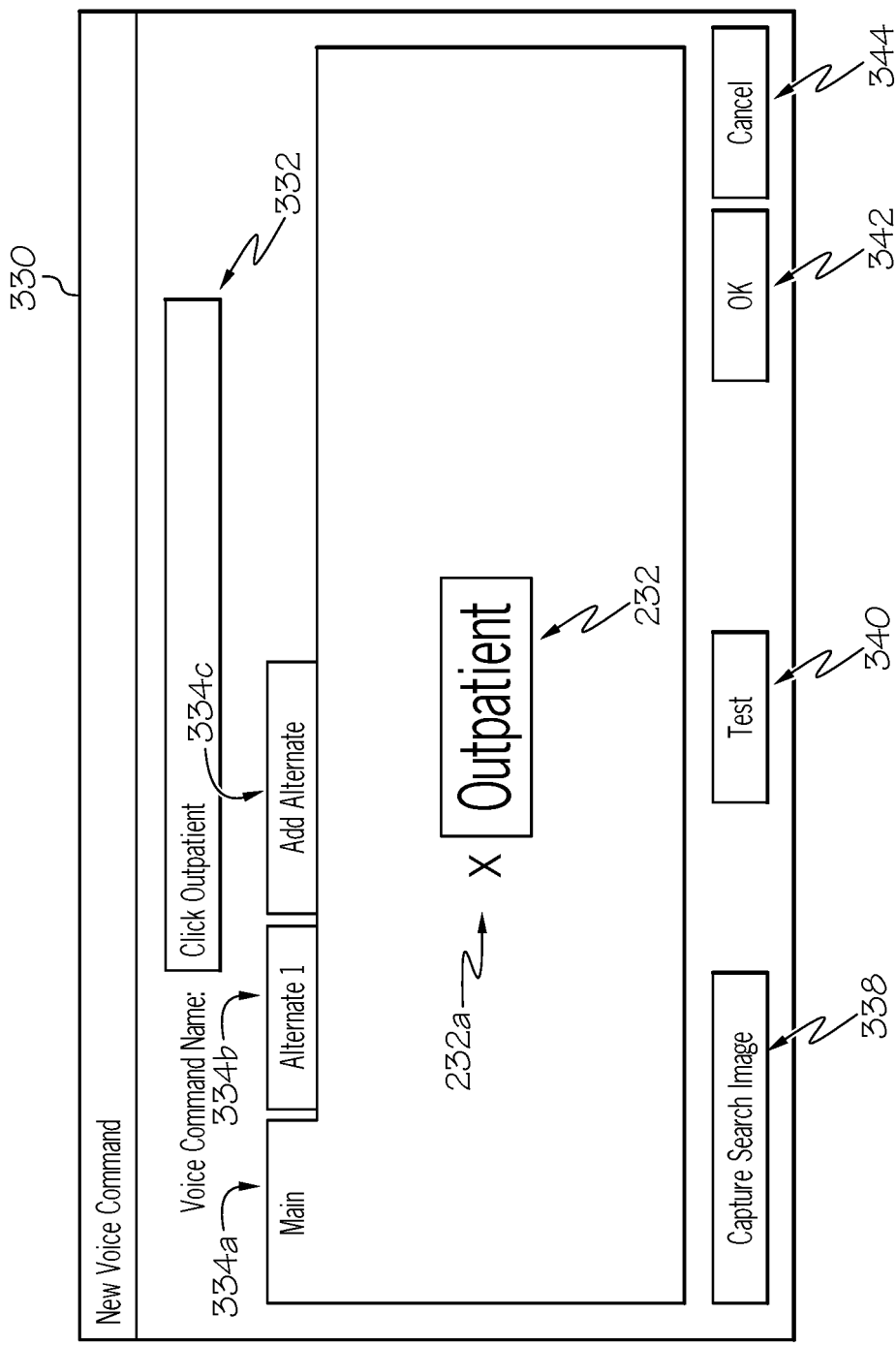
FIG. 3 depicts a user interface of a selector tool for creating a new voice command function, according to embodiments described herein.

FIG. 3 depicts a user interface 330 of a selector tool for creating a new voice command, according to embodiments described herein. As illustrated, the user interface 330 includes a voice command name field 332 for a user to input a name for the voice command function. Tabs 334a, 334b, and 334c provide default and alternate images for the voice command. As an example, under the main tab 334a, the user has selected the check box location 232a associated with the outpatient field 232 from FIG. 2 as the sub-area for the mouse click to occur. In some embodiments, the user may select the desired sub-area from the user interface 230 (FIG. 2) via the main tab 334a superimposing at least a portion of the user interface 230 into the user interface 330 (FIG. 3). Some embodiments, may simply route the user back to the user interface 230 for identifying the sub-area relative to the search image. Typically, selecting the image may be performed via a mouse selection; however, this is merely an example.

It will be understood that, when selecting the checkbox associated with the outpatient field 232 and the sub-area 232a, the user interface 330 may provide a zoomed view of the user interface 230 to provide the user with a greater ability to select the desired areas and sub-areas. Other features for providing greater precision may also be provided.

Also provided in the user interface 330 are a capture search image option 338, a test option 340, an accept option 342, and a cancel option 344. In response to a user selection of the capture search image option 338, the user may be taken to the user interface 230 (FIG. 2) and/or to another place (such as on the internet) to identify and/or locate the desired image for this voice command function. Similarly, by selecting the tabs 334b, 334c, the user may select alternate images for this voice command function. As part of capturing the search image the DPI (dots per inch) is recorded such that it can be scaled as needed if utilized on a monitor or workstation configured for a higher or lower DPI.

In response to selection of the test option 340, a test may be run to ensure that the command is executed properly. In the example of FIG. 3, a test would be performed to ensure the checkbox is checked when the voice command function is executed. In response to selection of the accept option 342, the voice command will be recorded and saved with the action created in the user interface 330. In response to selection of the cancel option, creation of the new voice command function will be canceled.

Once the voice command function is created, the voice command function may be utilized. As an example, the system may receive a user voice command. The embodiments may then determine that the user voice command is associated with the search image and select the sub-area of the user interface. If the area is a text field, embodiments may receive a voice dictation from the user and transcribe the voice dictation into the area of the user interface.

Figure 4:
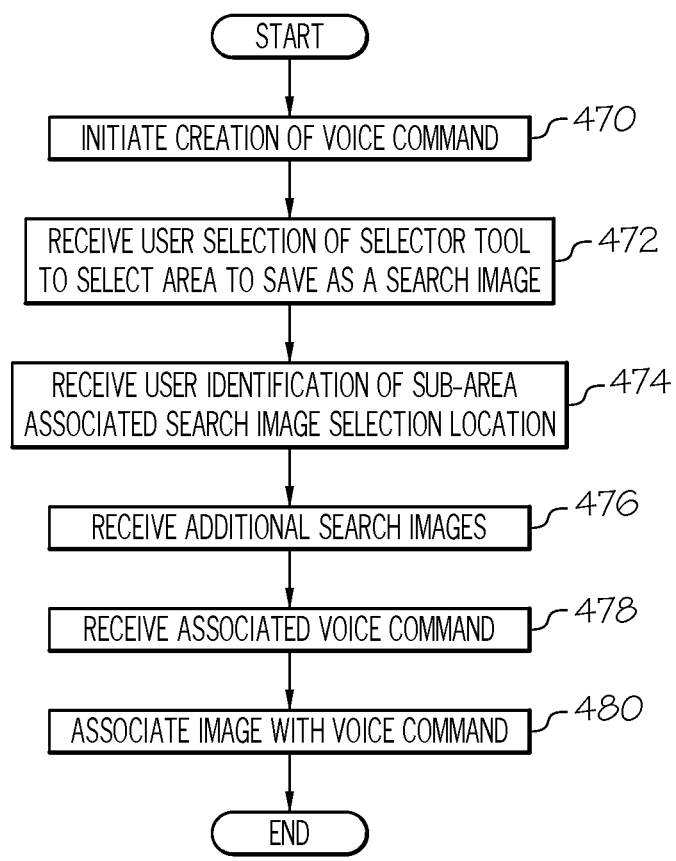
FIG. 4 depicts a flowchart for creating a new voice command function, according to embodiments described herein.

FIG. 4 depicts a flowchart for creating a new voice command function, according to embodiments described herein. As illustrated in block 470, creation of a voice command function may be initiated. As described above, this may include instantiating the selector tool and/or via other user action. In block 472, a user selection of the selector tool may be received to select an area to save as a search image. In block 474, user identification of a sub-area associated with the search image selection location may be received. In block 476, additional search images may be received. In block 478 a voice command may be received for associating with the voice command function. In block 480, the image may be associated with the voice command as part of the voice command function.

Figure 5:
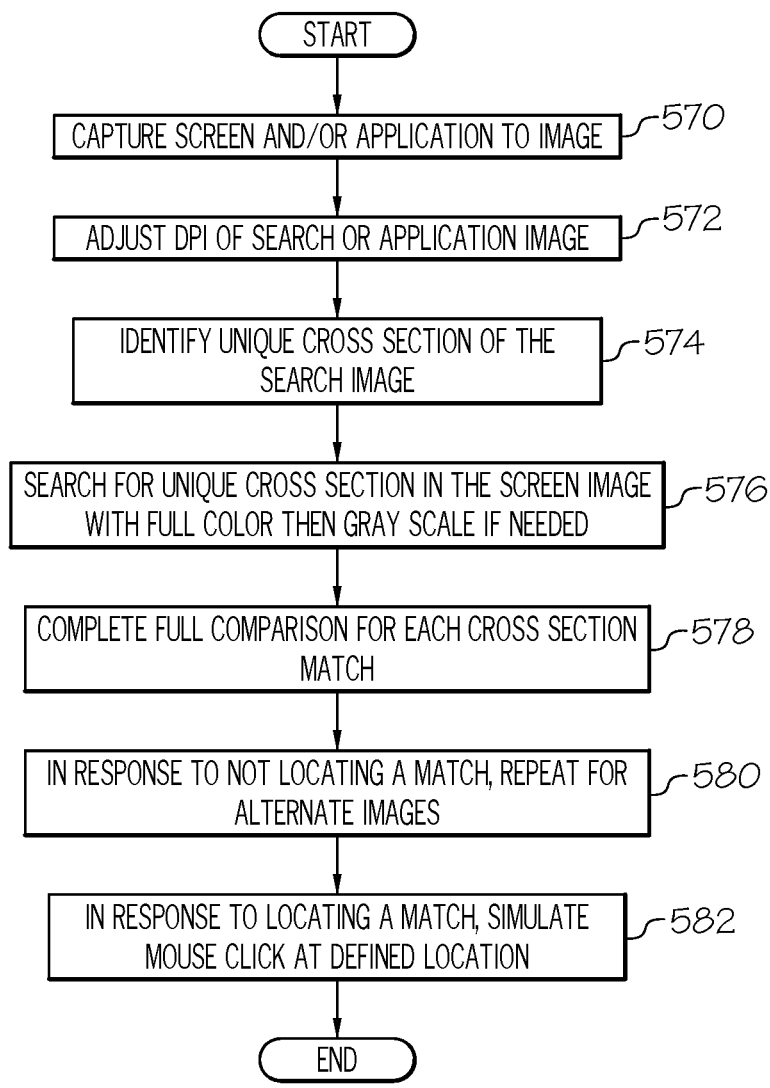
FIG. 5 depicts a flowchart for implementing a voice command function, according to embodiments described herein.

FIG. 5 depicts a flowchart for using image searching with voice recognition commands, according to embodiments described herein. As illustrated in block 570, the user's screen and/or current application may be captured for implementing a voice recognition function. In block 572, either the search image or the full image is scaled upwards to match the higher of the two image's DPI in order to ensure an accurate comparison of pixels. In block 574 a unique cross section of the search image may be identified. This unique cross section may have also been pre-identified in user interface 330 at the time the search image was captured. Specifically, screen areas that a user may wish to select with a mouse may involve a text label (such as a menu option or a button with a label). Sometimes the area to be selected will be a small image (or icon) of some kind. In order to optimize search time, some embodiments reduce the amount of time looking at each pixel of the full image and instead the search a row of pixels across the search image or a subsection of the pixels as being the most unique row within the search image. Typically, a row in the middle is likely to be most unique.

In block 576, a search may be performed for a unique cross section in the screen image. Initially a full color comparison is performed and if there is no match then both the search image and the full image can be converted to gray scale and searched again. The latter gray scale search may not perform as quickly, but allows for more variances that could be introduced with resolution, DPI scaling, and other system adjustments. In block 578, a full comparison for each cross section match may be performed if there is more than one possible match to the unique cross section search. In block 580, in response to not locating a match, the searching may be repeated for alternate images. In block 582, in response to locating a match, a mouse click may be simulated at a predetermined location.

Specifically, once a row or sub-row of pixels is identified, embodiments may scan each pixel (or a plurality of pixels) of the full image to find a matching sequence of pixel colors that match the search image. If a match is found, the starting pixel coordinates may then be saved into a list of potential matches. If more than one match is found, a full comparison of each pixel of the search image to each candidate area of the full image may be performed to determine which area matches exactly to the search image. To accommodate slight color variations between the full image and the search image the search algorithm can optionally employ a color tolerance difference level such that if the color compares are within a predefined range they would still be considered a match.

If more than one exact match is found, search indicators may be displayed for the user use a subsequent voice command to instruct the speech application which search image they want to select. Once the coordinates of the search image within the full image have been found, embodiments may simulate a mouse click at the predefined coordinates relative to the search image and relative to its position on the screen.

An additional usage of this process may instead exclude executing a mouse click on the search image; and rather use its existence on the screen to perform a dependent action. For example, a voice command may include a multi-step command such that first a check to see if the search image exists is performed; and, based on its existence, a particular action may be performed.

Figure 6:
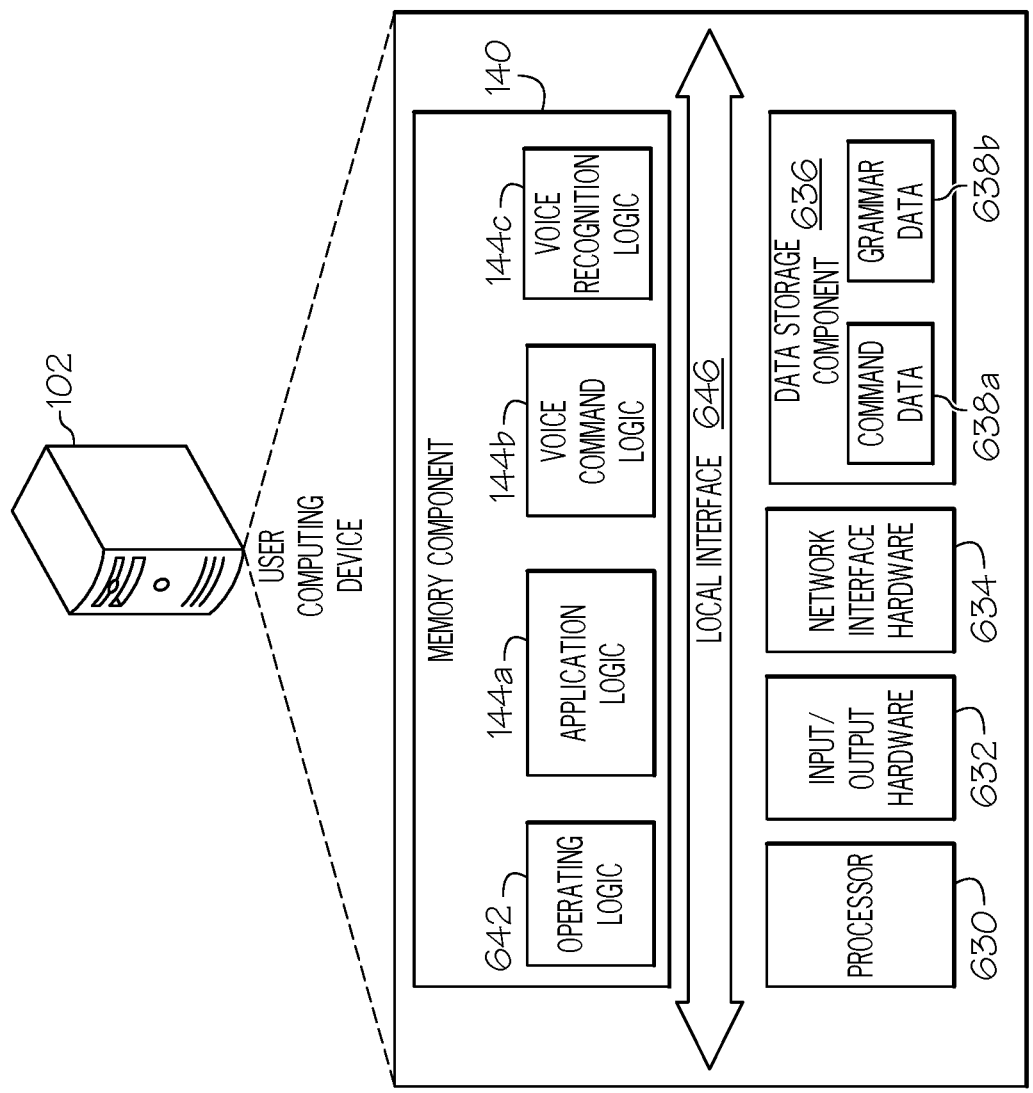
FIG. 6 depicts a user computing device using image searching with voice recognition commands, according to embodiments described herein.

FIG. 6 depicts a user computing device using image searching with voice recognition commands, according to embodiments described herein. As illustrated, the user computing device 102 includes a processor 1230, input/output hardware 1232, network interface hardware 1234, a data storage component 1236 (which stores command data 1238a, grammar data 1238b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the user computing device 102 and/or external to the user computing device 102.

The memory component 140 may store operating logic 1242, the application logic 144a, the voice command logic 144b, and the voice recognition logic 144c. The application logic 144a, the voice command logic 144b, and the voice recognition logic 144c may each include a plurality of different pieces of logic, each of which may be embodied as a computer program, firmware, and/or hardware, as an example. A local interface 1246 is also included in FIG. 12 and may be implemented as a bus or other communication interface to facilitate communication among the components of the user computing device 102.

The processor 1230 may include any processing component operable to receive and execute instructions (such as from a data storage component 1236 and/or the memory component 140). The input/output hardware 1232 may include and/or be configured to interface with microphones, speakers, a display, and/or other hardware.

The network interface hardware 1234 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the user computing device 102 and other computing devices, such as the remote computing device 104.

The operating logic 1242 may include an operating system and/or other software for managing components of the user computing device 102. As also discussed above, the application logic 144a, the voice command logic 144b, and the voice recognition logic 144c may reside in the memory component 140 and may be configured to perform the functionality, as described herein.

It should be understood that while the components in FIG. 12 are illustrated as residing within the user computing device 102, this is merely an example. In some embodiments, one or more of the components may reside external to the user computing device 102. It should also be understood that, while the user computing device 102 is illustrated as a single device, this is also merely an example. In some embodiments, the application logic 144a, the voice command logic 144b, and the voice recognition logic 144c may reside on different computing devices. As an example, one or more of the functionalities and/or components described herein may be provided by a user computing device 102 and/or the remote computing device 104, which may be coupled to the user computing device 102 via the network 100.

Additionally, while the user computing device 102 is illustrated with the application logic 144a, the voice command logic 144b, and the voice recognition logic 144c as separate logical components, this is also an example. In some embodiments, a single piece of logic (and/or or several linked modules) may cause the user computing device 102 to provide the described functionality.

As illustrated above, various embodiments for using image searching with voice recognition commands are disclosed. As such, embodiments described herein allow a user to provide a voice command related to selection of a button that is only identified by an image or other non-textual identifier. This enhances the capabilities of voice recognition.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for using image searching with voice recognition commands It should also be understood that these embodiments are merely exemplary and are not intended to limit the scope of this disclosure.

What is claimed is:

1. A method for using image searching with voice recognition commands comprising:
   providing, by a computing device, a user interface via a target application;
   receiving, by the computing device, a user selection of an area on the user interface by a user, the area including a search image for which an associated voice command will be assigned;
   receiving a user selection of a sub-area within the search image for associating with the associated voice command;
   receiving, by the computing device, the associated voice command to trigger an action on the search image;
   associating, by the computing device, the associated voice command with the search image such that when a user voice command is provided that matches the associated voice command, the action is taken on the search image;
   receiving the user voice command;
   determining that the user voice command is associated with the associated voice command and thus the search image;
   retrieving the action and a location of the sub-area, based on the associated voice command and the received user selection of the sub-area, wherein the location of the sub-area represents a position at which the action should be performed; and
   executing the action on the sub-area of the user interface.

2. The method of claim 1, further comprising:
   receiving the user voice command from the user, wherein the user voice command include s a voice dictation; and
   transcribing the voice dictation into the area of the user interface.

3. The method of claim 1, further comprising:
   identifying a unique cross section of the search image; and
   searching of the unique cross section in the user interface.

4. The method of claim 1, further comprising performing a test of the associated voice command and the search image.

5. The method of claim 1, further comprising receiving an alternate image for associating with the associated voice command.

6. The method of claim 5, further comprising:
   receiving the user voice command;
   searching for the search image associated with the user voice command; and
   in response to not locating the search image that is associated with the user voice command, searching for the alternate image associated with the user voice command.

7. A system for using image searching with voice recognition commands comprising:
   a computing device that stores application logic, voice command logic, and voice recognition logic that, when executed by the computing device, causes the system to perform at least the following:
      provide, via the application logic, a user interface with at least one user option;
      receive, via the voice command logic, a user selection of an area on the user interface by a user using a mouse device, the area corresponding with the at least one user option, the area including a search image;
      receive, via the voice command logic, a user selection of a sub-area within the search image for associating with the associated voice command;
      receive, via the voice command logic, an associated voice command for triggering an action on the search image;
      associate, via the voice command logic, the associated voice command with the search image such that when a user speaks the associated voice command, the at least one user option is selected by performing the action on the search image;
      receive, via the voice command logic, the user voice command;
      determine that the user voice command is associated with the associated voice command and thus the search image;
      retrieve, via the voice command logic, the action and a location of the sub-area, based on the associated voice command and the received user selection of the sub-area, wherein the location of the sub-area represents a position at which the action should be performed; and
      execute, via the voice command logic, the action on the sub-area of the user interface.

8. The system of claim 7, wherein the computing device further causes the system to perform the following:
   identify, via the voice command logic, a unique cross section of the search image; and
   search, via the voice command logic, of the unique cross section in the user interface.

9. The system of claim 7, wherein the computing device further causes the system to perform, via the voice command logic, a test of the associated voice command and the search image.

10. The system of claim 7, wherein the computing device further causes the system to receive, via the voice command logic, an alternate image for associating with the associated voice command.

11. The system of claim 10, wherein the computing device further causes the system to perform the following:
   receive the user voice command;
   search, via the voice command logic, for the search image associated with the user voice command; and
   in response to not locating a match, search, via the voice command logic, for the alternate image associated with the user voice command.

12. The system of claim 7, wherein the computing device further causes the system to perform the following:
   receive a user voice command;
   identify, via the voice recognition logic, a meaning of the user voice command;
   determine, via the voice command logic, that the user voice command corresponds with the associated voice command; and
   in response to determining that the user voice command corresponds with the associated voice command, select, via the application logic, the user option that corresponds with the search image.

13. The system of claim 12, wherein the computing device further causes the system to perform the following:
   receive, via the voice recognition logic, the user voice command, wherein the user voice command includes a voice dictation from the user; and
   transcribe, via the voice command logic, the voice dictation into the area of the user interface.

14. A non-transitory computer-readable medium that includes logic, that when executed by a processor, causes a computing device to perform at least the following:
   provide a user interface with a user option via a target application;
   receive a user selection of an area on the user interface by a user via a mouse cursor, the area corresponding to the user option, the area including a search image;
   receive a user selection of a sub-area within the search image for associating with the associated voice command;
   receive an associated voice command for triggering an action on the search image;
   associate the associated voice command with the search image such that receiving a user voice command that matches the associated voice command triggers a search for the search image and, in response to locating the search image, causes the action on the search image, thereby causing the action on the user option;
   receive the user voice command;
   determine that the user voice command matches the associated voice command and is thus associated with the search image;
   retrieve the action and a location of the sub-area, based on the associated voice command and the received user selection of the sub-area, wherein the location of the sub-area represents a position at which the action should be performed; and
   perform the action on the sub-area of the user interface.

15. The non-transitory computer-readable medium of claim 14, wherein the logic further causes the computing device to perform the following:
   receive the user voice command from the user, wherein the user voice command includes a voice dictation; and
   transcribe the voice dictation into the area of the user interface.

16. The non-transitory computer-readable medium of claim 14, wherein the logic further causes the computing device to perform the following:
   identify a unique cross section of the search image; and
   search of the unique cross section in the user interface.

17. The non-transitory computer-readable medium of claim 14, wherein the logic further causes the computing device to receive an alternate image for associating with the associated voice command.

18. The non-transitory computer-readable medium of claim 17, wherein the logic further causes the computing device to perform the following:
   receive the user voice command;
   search for the search image associated with the user voice command; and
   in response to not locating the search image, search for the alternate image associated with the user voice command.

* * * * *